United States Patent
Kousai

(10) Patent No.: US 8,525,496 B2
(45) Date of Patent: Sep. 3, 2013

(54) DC-DC CONVERTER AND SEMICONDUCTOR CHIP

(75) Inventor: Shouhei Kousai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 297 days.

(21) Appl. No.: 13/032,941

(22) Filed: Feb. 23, 2011

(65) Prior Publication Data

US 2012/0056606 A1    Mar. 8, 2012

(30) Foreign Application Priority Data

Sep. 2, 2010 (JP) .................................. 2010-196498

(51) Int. Cl.
*G05F 1/00* (2006.01)

(52) U.S. Cl.
USPC ........................................................ 323/271

(58) Field of Classification Search
USPC .................................................. 323/282, 271
See application file for complete search history.

(56) References Cited

U.S. PATENT DOCUMENTS

| | | | |
|---|---|---|---|
| 7,683,729 B2* | 3/2010 | Mansuri et al. | 327/103 |
| 7,928,806 B2* | 4/2011 | Lee et al. | 327/157 |
| 2004/0032302 A1* | 2/2004 | Chominski | 331/100 |
| 2007/0222489 A1* | 9/2007 | Kousai | 327/156 |
| 2008/0238503 A1* | 10/2008 | Mansuri et al. | 327/156 |
| 2008/0258779 A1* | 10/2008 | Wadatsumi et al. | 327/108 |
| 2008/0303603 A1 | 12/2008 | Kousai et al. | |
| 2009/0058386 A1* | 3/2009 | Tarng et al. | 323/282 |
| 2009/0201097 A1* | 8/2009 | Kossel et al. | 331/117 R |

FOREIGN PATENT DOCUMENTS

| | | |
|---|---|---|
| JP | 2005-168106 | 6/2005 |
| JP | 2009-44831 | 2/2009 |

* cited by examiner

*Primary Examiner* — Jue Zhang
(74) *Attorney, Agent, or Firm* — Oblon, Spivak, McClelland, Maier & Neustadt, L.L.P.

(57) ABSTRACT

A DC-DC converter including a first inductor connected between a second end of a first MOS transistor and an output terminal, a second inductor connected between a second end of a third MOS transistor and the output terminal, a first capacitor connected between the second MOS transistor and the third MOS transistor, a second capacitor connected between the fourth MOS transistor and the first MOS transistor and a third capacitor connected between the first MOS transistor and the third MOS transistor. Also included in the converter is a first resistor connected to a gate of the second MOS transistor, a second resistor connected to a gate of the fourth MOS transistor, and a first bias adjustment circuit which compares the output voltage with a preset first reference voltage and applies a first bias voltage to the resistors to make the output voltage equal to the first reference voltage.

20 Claims, 6 Drawing Sheets

DC-DC CONVERTER AND SEMICONDUCTOR CHIP

CROSS-REFERENCE TO RELATED APPLICATION

This application is based upon and claims the benefit of priority from the prior Japanese Patent Application No. 2010-196498, filed on Sep. 2, 2010, the entire contents of which are incorporated herein by reference.

BACKGROUND

1. Field

Embodiments described herein relate generally to a DC-DC converter.

2. Background Art

Conventionally, for example, there is the so-called PWM controlled DC-DC converter obtained by connecting a plurality of PWM (Pulse Width Modulation) switching DC-DC converters in parallel.

Such a conventional DC-DC converter has, for example, a problem that it is necessary to increase inductance of an inductor functioning as a filter to reduce the ripple, resulting in an increased circuit area.

DETAILED DESCRIPTION

A DC-DC converter according to an embodiment includes an output terminal which outputs an output voltage. The DC-DC converter includes a first MOS transistor of a first conductivity type connected at a first end thereof to a first voltage line, a first voltage being applied to the first voltage line. The DC-DC converter includes a second MOS transistor of a second conductivity type connected at a first end thereof to a second end of the first MOS transistor and connected at a second end thereof to a second voltage line, a second voltage being applied to the first voltage line and being different from the first voltage. The DC-DC converter includes a third MOS transistor of the first conductivity type connected at a first end thereof to the first voltage line. The DC-DC converter includes a fourth MOS transistor of the second conductivity type connected at a first end thereof to a second end of the third MOS transistor and connected at a second end thereof to the second voltage line. The DC-DC converter includes a first inductor connected between the second end of the first MOS transistor and the output terminal. The DC-DC converter includes a second inductor connected between the second end of the third MOS transistor and the output terminal. The DC-DC converter includes a first capacitor connected between a gate of the second MOS transistor and the second end of the third MOS transistor. The DC-DC converter includes a second capacitor connected between a gate of the fourth MOS transistor and the second end of the first MOS transistor. The DC-DC converter includes a third capacitor connected at a first end thereof to the second end of the first MOS transistor and connected at a second end to the second end of the third MOS transistor. The DC-DC converter includes a first resistor connected at a first end to the gate of the second MOS transistor. The DC-DC converter includes a second resistor connected at a first end thereof to the gate of the fourth MOS transistor. The DC-DC converter includes a first bias adjustment circuit which compares the output voltage with a preset first reference voltage and which applies a first bias voltage to a second end of the first resistor and a second end of the second resistor to make the output voltage equal to the first reference voltage.

Hereafter, a DC-DC converter according to the present invention will be described more specifically with reference to the drawings.

(First Embodiment)

Figure 1:
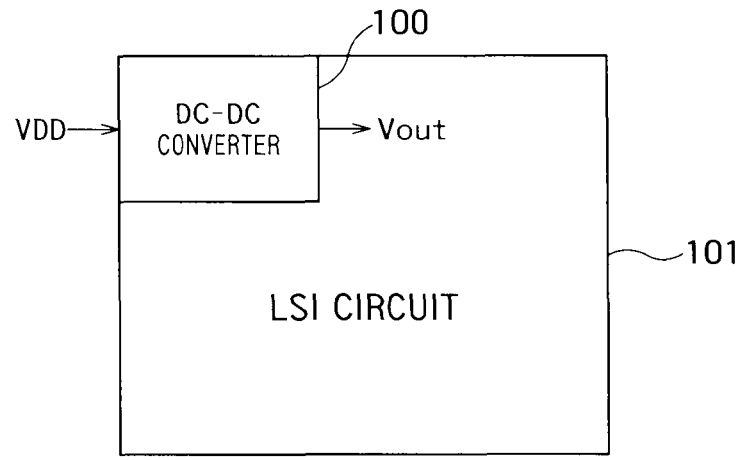
FIG. 1 is a diagram showing an example of a configuration of a semiconductor chip 1000 according to the present embodiment.

FIG. 1 is a diagram showing an example of a configuration of a semiconductor chip 1000 according to the present embodiment.

As shown in FIG. 1, the semiconductor chip 1000 includes an LSI (Large Scale Integration) circuit 101, and a DC-DC converter 100 which supplies an output voltage Vout generated from a power supply voltage VDD to the LSI circuit 101.

Figure 2:
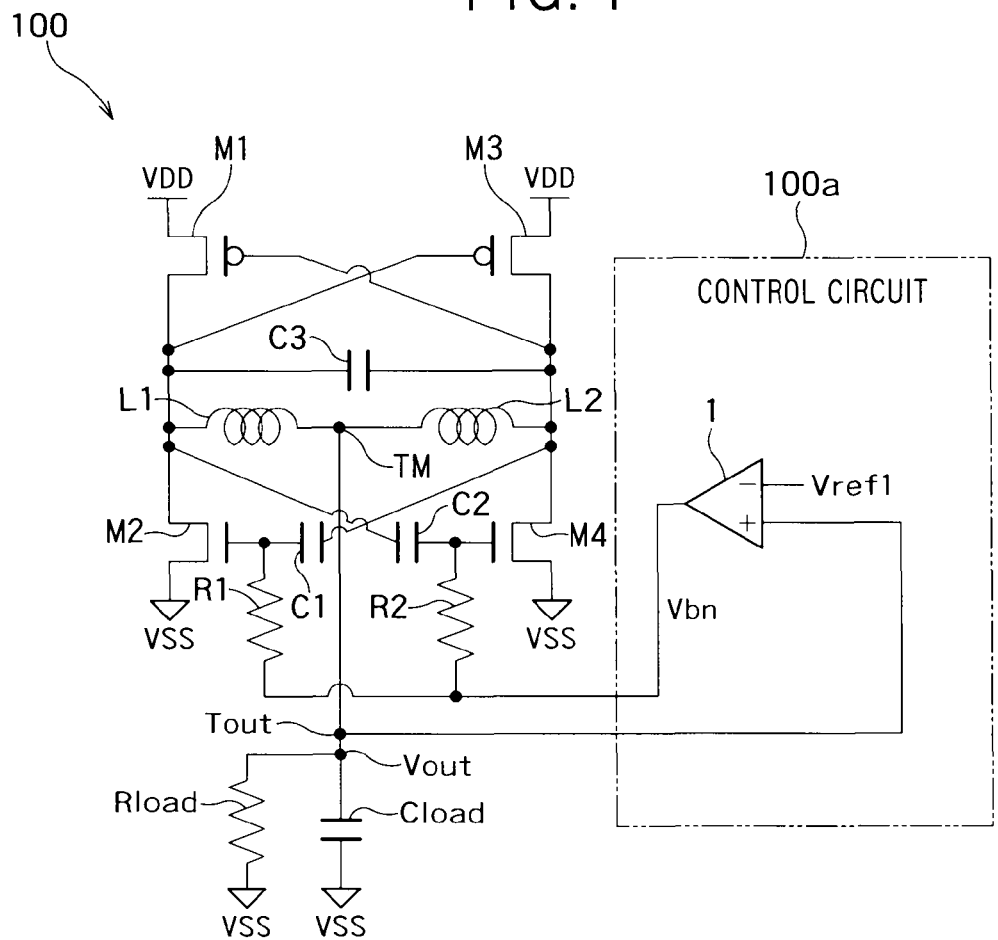
FIG. 2 is a diagram showing an example of a configuration of the DC-DC converter 100 according to the first embodiment shown in FIG. 1.

FIG. 2 is a diagram showing an example of a configuration of the DC-DC converter 100 according to the first embodiment shown in FIG. 1.

As shown in FIG. 2, the DC-DC converter 100 includes an output terminal Tout, a first MOS transistor of a first conductivity type (pMOS transistor) M1, a second MOS transistor of a second conductivity type (nMOS transistor) M2, a third MOS transistor of the first conductivity type (pMOS transistor) M3, a fourth MOS transistor of the second conductivity type (nMOS transistor) M4, a first inductor L1, a second inductor L2, a first capacitor C1, a second capacitor C2, a third capacitor C3, a first resistor R1, a second resistor R2, and a control circuit 100a.

The output terminal Tout is adapted to output an output voltage Vout generated by the DC-DC converter 100.

An external load Rload and an external capacitance Cload which functions as a stabilizing capacitance are connected in parallel between the output terminal Tout and a second voltage line VSS. The external load Rload and the external capacitance Cload are connected external to the DC-DC converter 100. By the way, the external capacitance Cload may be omitted as occasion demands.

The first MOS transistor M1 is connected at its first end (source) to a first voltage line VDD supplied with a first voltage (which is the power supply voltage here).

The second MOS transistor M2 is connected at its first end (drain) to a second end (drain) of the first MOS transistor M1, and connected at its second end (source) to the second voltage line VSS supplied with a second voltage (which is the ground voltage here) which is different from the first voltage.

The third MOS transistor M3 is connected at its first end (source) to the first voltage line VDD.

The fourth MOS transistor M4 is connected at its first end (drain) to a second end (drain) of the third MOS transistor M3, and connected at its second end (source) to the second voltage line VSS.

By the way, the first MOS transistor M1 and the third MOS transistor M3 have the same size. Furthermore, the second MOS transistor M2 and the fourth MOS transistor M4 have the same size.

Furthermore, the size of the first and third MOS transistors M1 and M3 is set to be greater than the size of the second and fourth MOS transistors M2 and M4.

The first inductor L1 is connected between the second end (drain) of the first MOS transistor M1 and the output terminal Tout.

The second inductor L2 is connected between the second end (drain) of the third MOS transistor M3 and the output terminal Tout.

By the way, the first inductor L1 and the second inductor L2 have the same inductance.

The first capacitor C1 is connected between a gate of the second MOS transistor M2 and the second end (drain) of the third MOS transistor M3. The first capacitor C1 prevents a DC current from flowing between the gate of the second MOS transistor M2 and the second end (drain) of the third MOS transistor M3, i.e., through the first resistor R1.

The second capacitor C2 is connected between a gate of the fourth MOS transistor M4 and the second end (drain) of the first MOS transistor M1. The second capacitor C2 prevents a DC current from flowing between the gate of the fourth MOS transistor M4 and the second end (drain) of the first MOS transistor M1, i.e., through the second resistor R2.

By the way, the first capacitor C1 and the second capacitor C2 have the same capacitance.

The third capacitor C3 is connected at its first end to the second end (drain) of the first MOS transistor M1 and connected at its second end to the second end (drain) of the third MOS transistor M3.

The first resistor R1 is connected at its first end to the gate of the second MOS transistor M2.

The second resistor R2 is connected at its first end to the gate of the fourth MOS transistor M4.

By the way, the first resistor R1 and the second resistor R2 have the same resistance value.

The control circuit 100a includes a first bias adjustment circuit 1.

The first bias adjustment circuit 1 is, for example, a first operational amplifier supplied at its first input terminal (inverting input terminal) with a first reference voltage Vref1, supplied at its second input terminal (noninverting input terminal) with the output voltage Vout, and connected at its output to a second end of the first resistor R1 and a second end of the second resistor R2.

The first operational amplifier is adapted to compare the first reference voltage Vref1 which is previously set with the output voltage Vout, and apply a first bias voltage Vbn to the second end of the first resistor R1 and the second end of the second resistor R2 to make the output voltage Vout equal to the first reference voltage Vref1.

In other words, the control circuit 100a compares the first reference voltage Vref1 which is previously set with the output voltage Vout, and controls the first bias voltage Vbn applied to the second end of the first resistor R1 and the second end of the second resistor R2 to make the output voltage Vout equal to the first reference voltage Vref1.

As a result, the output voltage Vout of the DC-DC converter 100 is set equal to the first reference voltage Vref1 which is a target voltage.

By the way, the first bias voltage Vbn at the time when the first reference voltage Vref1 is equal to the output voltage Vout is controlled to become lower than the threshold voltage of the second and fourth MOS transistors M2 and M4.

As a result, it is possible to restrict currents flowing through the second and fourth MOS transistors M2 and M4, and cause currents flowing through the first and third MOS transistors M1 and M3 to flow to the output terminal Tout side as much as possible.

In other words, the efficiency of the DC-DC converter 100 can be improved.

An example of operation of the DC-DC converter 100 having the configuration described heretofore will now be described.

The DC-DC converter 100 makes a transition alternately between a first state in which the first and fourth MOS transistors M1 and M4 are on and the second and third MOS transistors M2 and M3 are off and a second state in which the first and fourth MOS transistors M1 and M4 are off and the second and third MOS transistors M2 and M3 are on, and an LC-VCO formed of the first and second inductors L1 and L2 and the third capacitor C3 resonates.

Since the resonant frequency of the LC-VCO is high, a voltage which is kept constant is output to a terminal TM between the first inductor L1 and the second inductor L2. In other words, the output voltage Vout kept constant is output to the output terminal Tout.

By the way, since the DC-DC converter 100 has the differential configuration already described, the voltage at the terminal TM between the first inductor L1 and the second inductor L2 is reduced in ripple and is very stable. In other words, the DC-DC converter 100 can output more stabilized output voltage Vout.

Furthermore, as already described, the first and second inductors L1 and L2 and the third capacitor C3 included in the LC-VCO are formed of a semiconductor integrated circuit. As a result, the circuit area in the case where the DC-DC converter 100 is constituted in the form of on-chip can be reduced.

According to the DC-DC converter in the first embodiment, the output voltage can be made more stable while reducing the circuit area as described heretofore.

(Second Embodiment)

In the first embodiment already described, an example of a configuration in which the first bias voltage Vbn applied to the gates of the second and fourth MOS transistors M2 and M4 is controlled to control the output voltage Vout has been described.

In the present second embodiment, an example of a configuration for controlling the oscillation amplitude of the LC-VCO will be further described.

Figure 3:
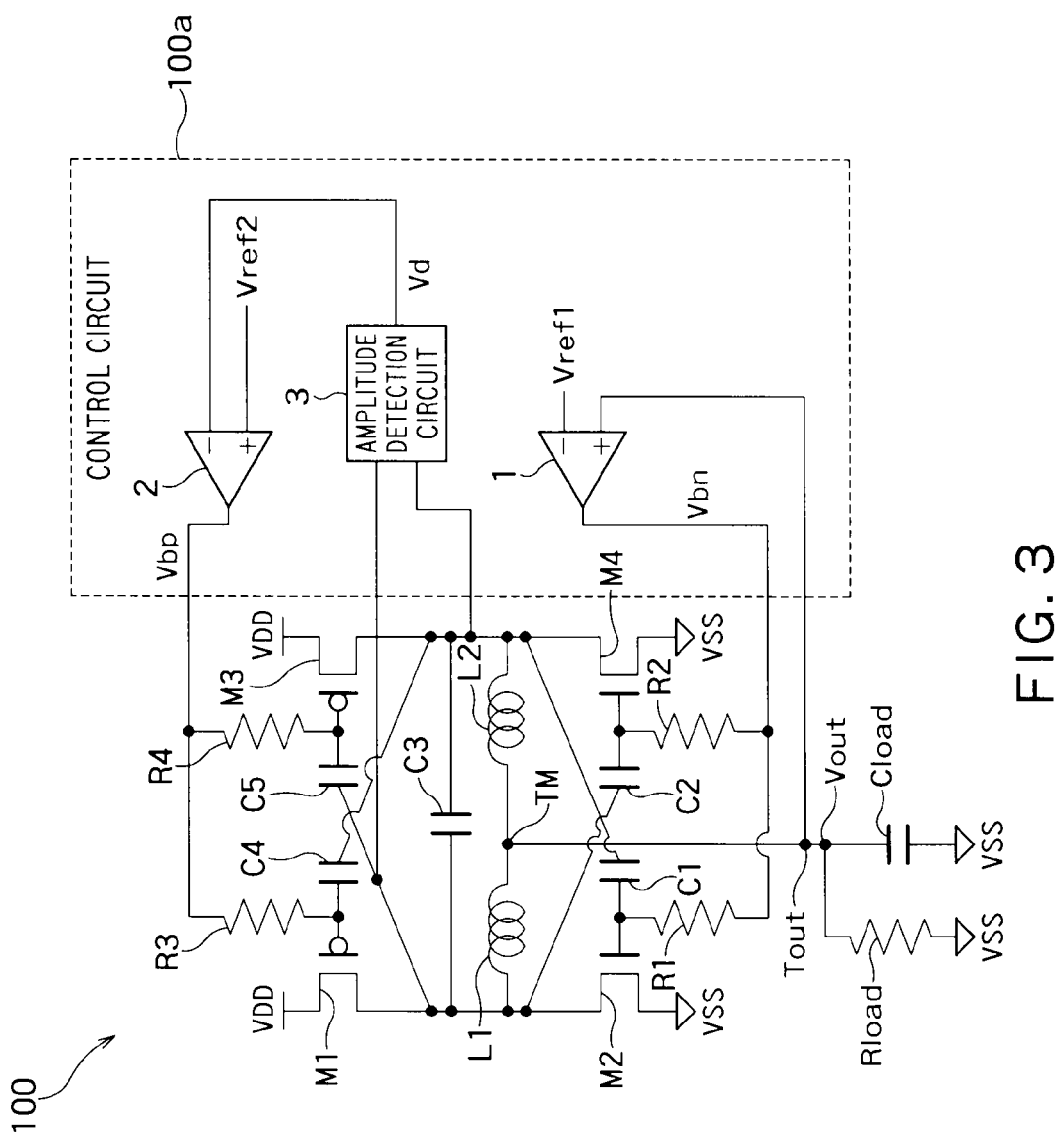
FIG. 3 is a diagram showing an example of a configuration of the DC-DC converter 100 shown in FIG. 1 according to the second embodiment.
Figure 4:
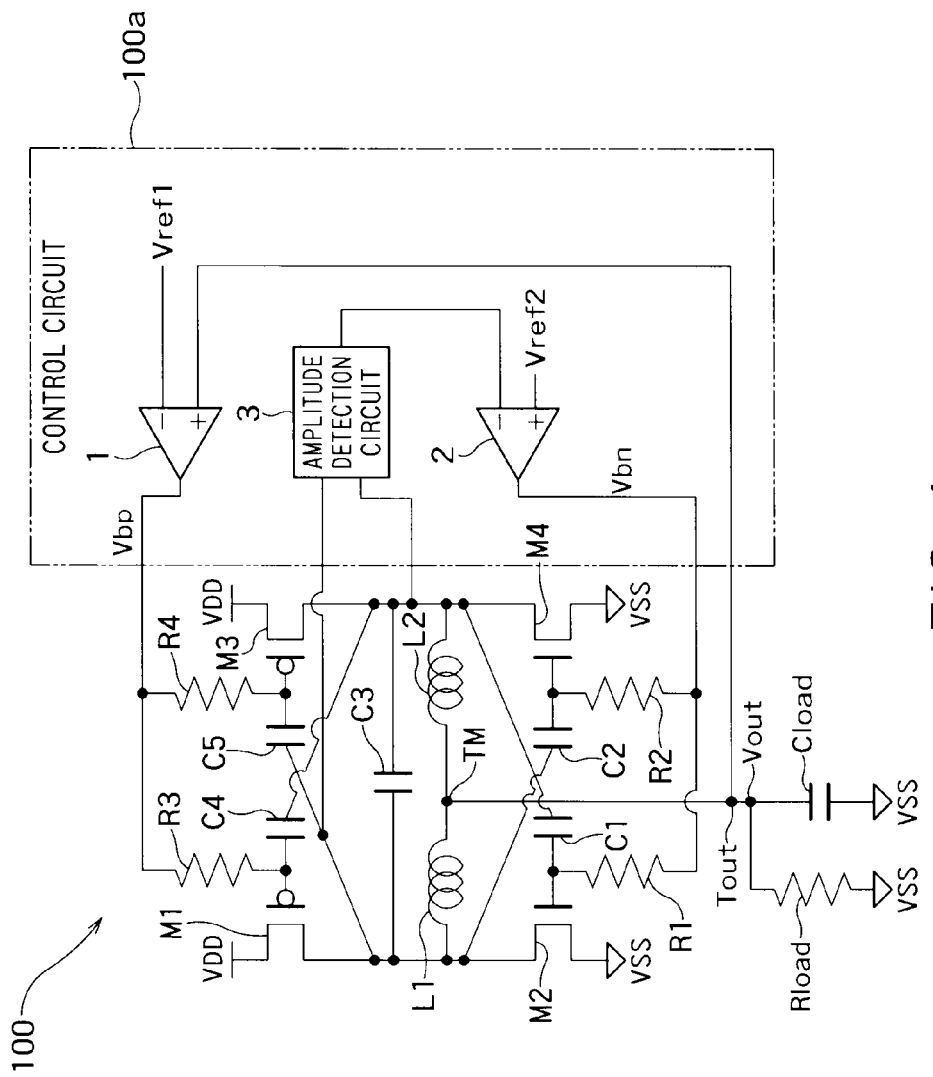
FIG. 4 is a diagram showing another example of a configuration of the DC-DC converter 100 shown in FIG. 1 according to the second embodiment.

FIG. 3 is a diagram showing an example of a configuration of the DC-DC converter 100 shown in FIG. 1 according to the second embodiment. FIG. 4 is a diagram showing another example of a configuration of the DC-DC converter 100 shown in FIG. 1 according to the second embodiment. By the way, in FIGS. 3 and 4, the same reference numerals as those in FIG. 2 denote like components in the first embodiment.

As shown in FIG. 3, the DC-DC converter 100 further includes a third resistor R3 and a fourth resistor R4 as compared with the first embodiment.

The third resistor R3 is connected at its first end to the gate of the first MOS transistor M1.

The fourth resistor R4 is connected at its first end to the gate of the third MOS transistor M3.

By the way, the third resistor R3 and the fourth resistor R4 have the same resistance value.

The control circuit 100a further includes a second bias adjustment circuit 2 and an amplitude detection circuit 3 as compared with the first embodiment.

The amplitude detection circuit 3 is adapted to detect a voltage difference (amplitude) between a voltage at the first end of the third capacitor C3 and a voltage at the second end of the third capacitor C3 and output a detected voltage Vd based on the voltage difference.

The second bias adjustment circuit 2 is adapted to compare a second reference voltage Vref2 which is previously set with the detected voltage Vd and apply a second bias voltage Vbp to a second end of the third resistor R3 and a second end of the fourth resistor R4 to cause the detected voltage Vd to become equal to the second reference voltage Vref2.

The second bias adjustment circuit 2 is, for example, a second operational amplifier supplied at its first input terminal (inverting input terminal) with the detected voltage Vd, supplied at its second input terminal (noninverting input terminal) with the second reference voltage Vref2, and connected at its output to a second end of the third resistor R3 and a second end of the fourth resistor R4.

In other words, in the present second embodiment, the control circuit 100a detects the voltage difference between the voltage at the first end of the third capacitor C3 and the voltage at the second end of the third capacitor C3 and generates the detected voltage Vd based on the voltage difference, besides the control operation in the first embodiment. And the control circuit 100a compares the second reference voltage Vref2 which is previously set with the detected voltage Vd, and applies the second bias voltage Vbp to the second end of the third resistor R3 and the second end of the fourth resistor R4 to cause the detected voltage Vd to become equal to the second reference voltage Vref2.

As a result, the oscillation amplitude of the LC-VCO in the DC-DC converter 100 is set to become target oscillation amplitude determined by the second reference voltage Vref2.

A configuration of remaining parts in the DC-DC converter 100 is the same as that in the first embodiment.

In the configuration shown in FIG. 3, the bias voltage Vbn applied to the gates of the second and fourth MOS transistors M2 and M4 is controlled to control the output voltage Vout, whereas the voltage Vbp applied to the gates of the first and third MOS transistors M1 and M3 is controlled to control the voltage difference (amplitude) across the third capacitor C3.

As shown in FIG. 4, alternatively, it is also possible to apply the bias voltage Vbp which is output by the first bias adjustment circuit 1 to the second ends of the third and fourth resistors R3 and R4 and apply the bias voltage Vbn which is output by the second bias adjustment circuit 2 to the second ends of the first and second resistors R1 and R2. In other words, the bias voltage Vbp applied to the gates of the first and third MOS transistors M1 and M3 may be controlled to control the output voltage Vout whereas the bias voltage Vbp applied to the gates of the second and fourth MOS transistors M2 and M4 may be controlled to control the voltage difference (amplitude) across the third capacitor C3.

Operation of the DC-DC converter 100 having the configuration described heretofore is similar to that of the DC-DC converter 100 in the first embodiment already described.

Since the DC-DC converter 100 has the differential configuration already described, the voltage at the terminal TM between the first inductor L1 and the second inductor L2 is reduced in ripple and is very stable in the same way as the first embodiment. In other words, the DC-DC converter 100 can output more stabilized output voltage Vout.

Furthermore, in the same way as the first embodiment, the first and second inductors L1 and L2 and the third capacitor C3 included in the LC-VCO are formed of a semiconductor integrated circuit. As a result, the circuit area in the case where the DC-DC converter 100 is constituted in the form of on-chip can be reduced.

According to the DC-DC converter in the present second embodiment, the output voltage can be made more stable while reducing the circuit area in the same way as the first embodiment as heretofore described.

(Third Embodiment)

In the present third embodiment, an example of a configuration for controlling the output voltage Vout and the oscillation amplitude of the LC-VCO in an analog manner will be described.

Figure 5:
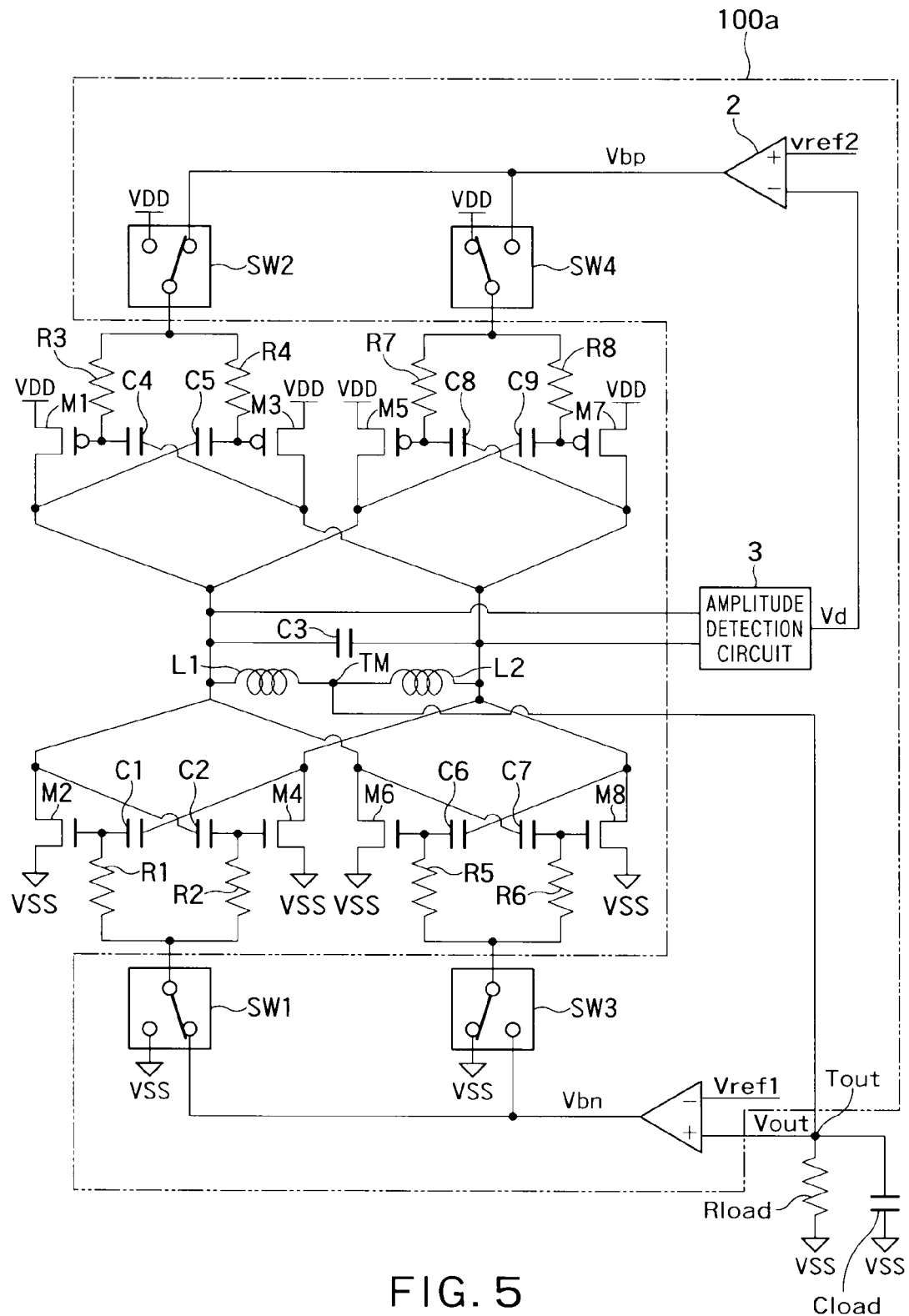
FIG. 5 is a diagram showing an example of a configuration of the DC-DC converter 100 shown in FIG. 1 according to the third embodiment.

FIG. 5 is a diagram showing an example of a configuration of the DC-DC converter 100 shown in FIG. 1 according to the third embodiment. By the way, in FIG. 5, the same reference numerals as those in FIGS. 2 to 4 denote like components in the first embodiment.

As shown in FIG. 5, the DC-DC converter 100 further includes a fifth MOS transistor of the first conductivity type (pMOS transistor) M5, a sixth MOS transistor of the second conductivity type (nMOS transistor) M6, a seventh MOS transistor of the first conductivity type (pMOS transistor) M7, an eighth MOS transistor of the second conductivity type (nMOS transistor) M8, a sixth capacitor C6, a seventh capacitor C7, an eighth capacitor C8, a ninth capacitor C9, a fifth resistor R5, a sixth resistor R6, a seventh resistor R7, and a eighth resistor R8 as compared with the second embodiment.

The fifth MOS transistor M5 is connected at its first end (source) to the first voltage line VDD and connected at its second end (drain) to the first end of the third capacitor C3.

The sixth MOS transistor M6 is connected at its first end (drain) to the second end (drain) of the fifth MOS transistor M5, and connected at its second end (source) to the second voltage line VSS.

The seventh MOS transistor M7 is connected at its first end (source) to the first voltage line VDD and connected at its second end (drain) to the second end of the third capacitor C3.

The eighth MOS transistor M8 is connected at its first end (drain) to the second end (drain) of the seventh MOS transistor M7, and connected at its second end (source) to the second voltage line VSS.

The sixth capacitor C6 is connected between a gate of the sixth MOS transistor M6 and the second end (drain) of the seventh MOS transistor M7.

The seventh capacitor C7 is connected between a gate of the eighth MOS transistor M8 and the second end (drain) of the fifth MOS transistor M5.

The eighth capacitor C8 is connected between a gate of the fifth MOS transistor M5 and the second end (drain) of the eighth MOS transistor M8.

The ninth capacitor C9 is connected between a gate of the seventh MOS transistor M7 and the second end (drain) of the sixth MOS transistor M6.

The fifth resistor R5 is connected at its first end to the gate of the sixth MOS transistor M6.

The sixth resistor R6 is connected at its first end to the gate of the eighth MOS transistor M8.

The seventh resistor R7 is connected at its first end to the gate of the fifth MOS transistor M5.

The eighth resistor R8 is connected at its first end to the gate of the seventh MOS transistor M7.

The control circuit 100a further includes a first switch circuit SW1, a second switch circuit SW2, a third switch circuit SW3, and a fourth switch circuit SW4 as compared with the second embodiment.

The first switch circuit SW1 is connected between the output of the first bias adjustment circuit 1 and a second end of the first resistor R1 (a second end of the second resistor R2). The first switch circuit SW1 conducts switching between the first bias voltage Vbn and the second voltage (ground voltage), and applies one of them to the second end of the first resistor R1 and the second end of the second resistor R2.

When the first switch circuit SW1 applies the first bias voltage Vbn to the second end of the first resistor R1 and the second end of the second resistor R2, connection relations and operation similar to those in the second embodiment are obtained.

On the other hand, when the first switch circuit SW1 applies the second voltage (ground voltage) to the second end of the first resistor R1 and the second end of the second resistor R2, the second and fourth MOS transistors M2 and M4 are off and they do not operate.

The second switch circuit SW2 is connected between the output of the second bias adjustment circuit 2 and the second end of the third resistor R3 (the second end of the fourth resistor R4). The second switch circuit SW2 conducts switching between the second bias voltage Vbp and the first voltage (power supply voltage), and applies one of them to the second end of the third resistor R3 and the second end of the fourth resistor R4.

When the second switch circuit SW2 applies the second bias voltage Vbp to the second end of the third resistor R3 and the second end of the fourth resistor R4, connection relations and operation similar to those in the second embodiment are obtained.

On the other hand, when the second switch circuit SW2 applies the first voltage (power supply voltage) to the second end of third resistor R3 and the second end of the fourth resistor R4, the first and third MOS transistors M1 and M3 are off and they do not operate.

The third switch circuit SW3 is connected between the output of the first bias adjustment circuit 1 and a second end of the fifth resistor R5 (a second end of the sixth resistor R6). The third switch circuit SW3 conducts switching between the first bias voltage Vbn and the second voltage (ground voltage), and applies one of them to the second end of the fifth resistor R5 and the second end of the sixth resistor R6.

When the third switch circuit SW3 applies the first bias voltage Vbn to the second end of the fifth resistor R5 and the second end of the sixth resistor R6, connection relations and operation similar to those in the second embodiment are obtained.

On the other hand, when the third switch circuit SW3 applies the second voltage (ground voltage) to the second end of the fifth resistor R5 and the second end of the sixth resistor R6, the sixth and eighth MOS transistors M6 and M8 are off and they do not operate.

The fourth switch circuit SW4 is connected between the output of the second bias adjustment circuit 2 and the second end of the seventh resistor R7 (the second end of the eighth resistor R8). The fourth switch circuit SW4 conducts switching between the second bias voltage Vbp and the first voltage (power supply voltage), and applies one of them to the second end of the seventh resistor R7 and the second end of the eighth resistor R8.

When the fourth switch circuit SW4 applies the second bias voltage Vbp to the second end of the seventh resistor R7 and the second end of the eighth resistor R8, connection relations and operation similar to those in the second embodiment are obtained.

On the other hand, when the fourth switch circuit SW4 applies the first voltage (power supply voltage) to the second end of seventh resistor R7 and the second end of the eighth resistor R8, the fifth and seventh MOS transistors M5 and M7 are off and they do not operate.

In this way, the number of MOS transistors brought into operation can be controlled by controlling the first to fourth switch circuits SW1 to SW4. As a result, currents flowing through MOS transistors are controlled, and the output voltage Vout and the oscillation amplitude of the LC-VCO can be controlled in the analog manner.

In the present third embodiment as well, it is also possible to apply the bias voltage Vbp which is output by the first bias adjustment circuit 1 to the second ends of the third and fourth resistors R3 and R4 and apply the bias voltage Vbn which is output by the second bias adjustment circuit 2 to the second ends of the first and second resistors R1 and R2, as shown in FIG. 4 of the second embodiment.

Operation of the DC-DC converter 100 having the configuration described heretofore is similar to that of the DC-DC converter 100 in the first embodiment already described.

Since the DC-DC converter 100 has the differential configuration already described, the voltage at the terminal TM between the first inductor L1 and the second inductor L2 is reduced in ripple and is very stable in the same way as the first and second embodiments. In other words, the DC-DC converter 100 can output more stabilized output voltage Vout.

Furthermore, in the same way as the first and second embodiments, the first and second inductors L1 and L2 and the third capacitor C3 included in the LC-VCO are formed of a semiconductor integrated circuit. As a result, the circuit area in the case where the DC-DC converter 100 is constituted in the form of on-chip can be reduced.

According to the DC-DC converter in the present third embodiment, the output voltage can be made more stable while reducing the circuit area in the same way as the first and second embodiments as heretofore described.

(Fourth Embodiment)

In the present fourth embodiment, an example of a configuration for improving the efficiency of the DC-DC converter will be described.

Figure 6:
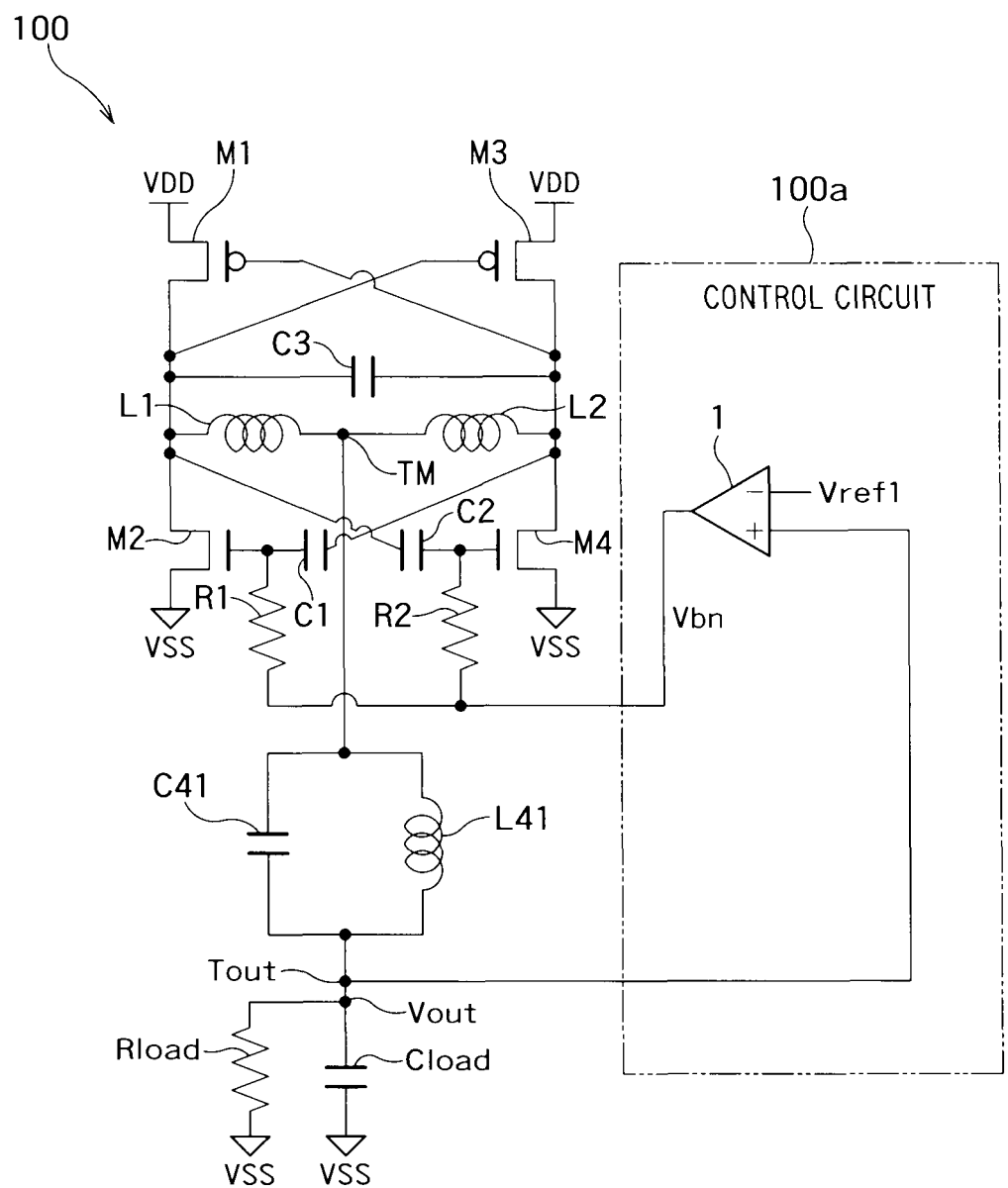
FIG. 6 is a diagram showing an example of a configuration of the DC-DC converter 100 shown in FIG. 1 according to the fourth embodiment.

FIG. 6 is a diagram showing an example of a configuration of the DC-DC converter 100 shown in FIG. 1 according to the fourth embodiment. By the way, in FIG. 6, the same reference numerals as those in FIGS. 2 to 4 denote like components in the first embodiment.

As shown in FIG. 6, the DC-DC converter 100 further includes a capacitor C41 and an inductor L41 as compared with the first embodiment. A configuration of remaining parts in the DC-DC converter 100 is the same as that in the first embodiment.

And the capacitor C41 and the inductor L41 are connected in parallel between the terminal TM and the output terminal Tout. The capacitor C41 and the inductor L41 constitute a resonant circuit.

It is now supposed that a resonant frequency f0 of a fundamental wave of a resonant circuit formed of the first and second inductors L1 and L2 and the third capacitor C3 is represented by Equation (1). It is supposed that the first and second inductors L1 and L2 have the same inductance $\frac{1}{2} \times L_{L1}$ and the third capacitor C3 has capacitance of $C_{C3}$.

$$f0 = 1/\{2\pi(L_{L1} \times C_{C3})\}^{0.5} \quad (1)$$

On the other hand, it is supposed that the resonant circuit formed of the inductor L41 and the capacitor C41 oscillates with a wave having a frequency which is twice the oscillation frequency f0, and its oscillation frequency 2×f0 is represented by Equation (2). It is supposed that the inductor L41 has inductance $L_{L41}$ and the capacitor C41 has capacitance $C_{C41}$.

$$2 \times f0 = 1/\{2\pi(L_{L41} \times C_{C41})\}^{0.5} \quad (2)$$

In this way, the LC resonant circuit (L41, C41) which oscillates with the wave having a frequency 2×f0 which is twice the oscillation frequency f0 is added to the DC-DC converter 100. Owing to the harmonic resonant circuit, the oscillation waveform can be made to more closely resemble a square wave.

As a result, it becomes possible to reduce overlapping in drain voltage and drain current of transistors and reduce the loss.

In other words, it is possible to reduce power dissipated by transistors in the resonant circuit formed of the first and second inductors L1 and L2 and the third capacitor C3 at the time of switching and improve the efficiency of the DC-DC converter.

Operation of the DC-DC converter 100 having the configuration described heretofore is similar to that of the DC-DC converter 100 in the first embodiment already described.

Since the DC-DC converter 100 has the differential configuration already described, the voltage at the terminal TM between the first inductor L1 and the second inductor L2 is reduced in ripple and is very stable in the same way as the first and second embodiment. In other words, the DC-DC converter 100 can output more stabilized output voltage Vout.

Furthermore, in the same way as the first and second embodiments, the first and second inductors L1 and L2 and the third capacitor C3 included in the LC-VCO are formed of a semiconductor integrated circuit. As a result, the circuit area in the case where the DC-DC converter 100 is constituted in the form of on-chip can be reduced.

According to the DC-DC converter in the present fourth embodiment, the output voltage can be made more stable while reducing the circuit area in the same way as the first and second embodiments as heretofore described.

(Fifth Embodiment)

In the present fifth embodiment, an example of a configuration for improving the efficiency of the DC-DC converter will be described.

Figure 7:
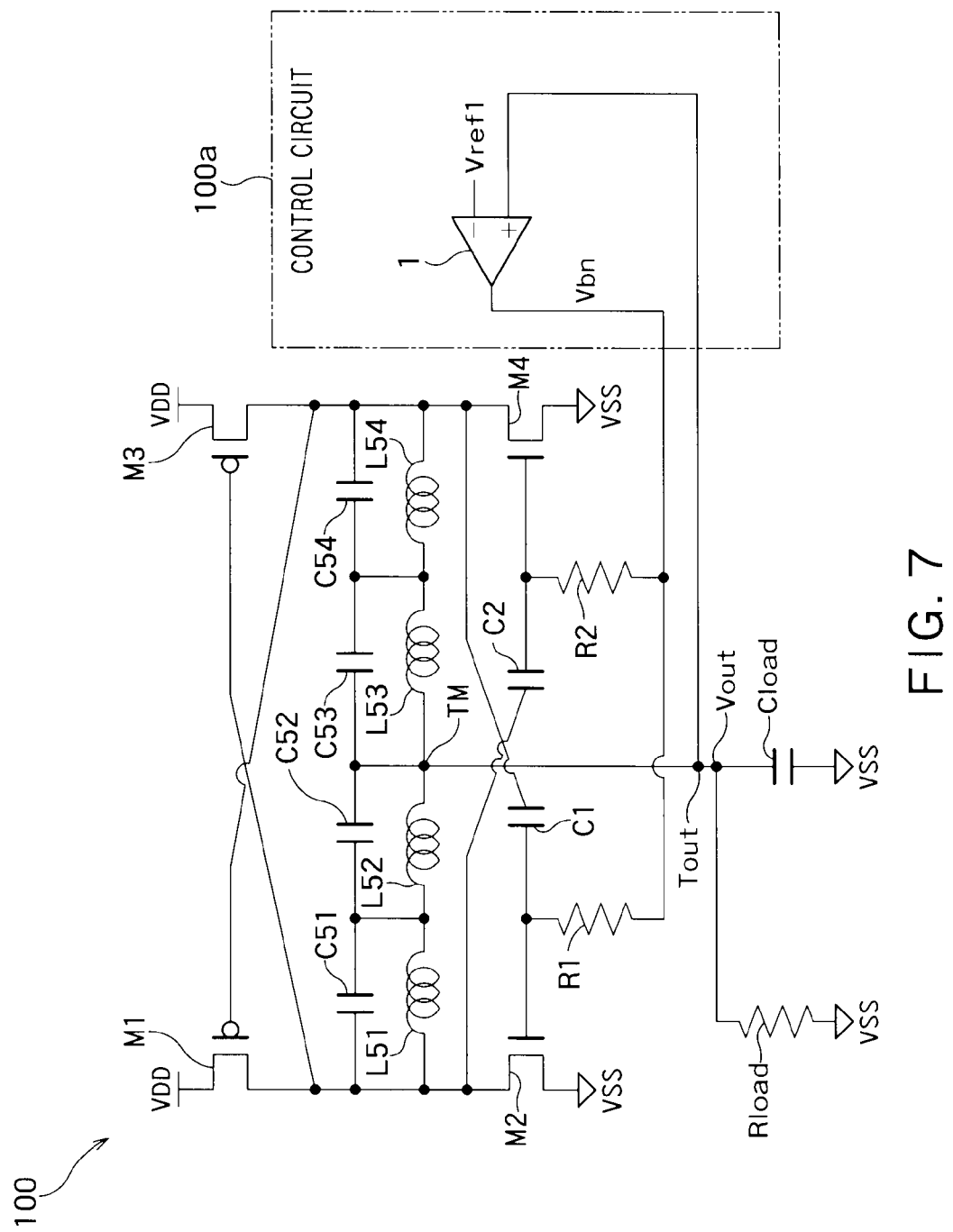
FIG. 7 is a diagram showing an example of a configuration of the DC-DC converter 100 shown in FIG. 1 according to the fifth embodiment.

FIG. 7 is a diagram showing an example of a configuration of the DC-DC converter 100 shown in FIG. 1 according to the fifth embodiment. By the way, in FIG. 7, the same reference numerals as those in FIGS. 2 to 4 denote like components in the first embodiment.

As shown in FIG. 7, the DC-DC converter 100 includes capacitors C51 to C54 and inductors L51 to L54 instead of the first and second inductors L1 and L2 and the third capacitor C3 as compared with the first embodiment. A configuration of remaining parts in the DC-DC converter 100 is the same as that in the first embodiment.

And the capacitors C51 to C54 are connected in series between the second end (drain) of the first MOS transistor M1 and the second end (drain) of the third MOS transistor M3.

The inductors L51 to L54 are connected in series between the second end (drain) of the first MOS transistor M1 and the second end (drain) of the third MOS transistor M3.

The terminal TM is connected between the capacitor C52 and the capacitor 53 (between the inductor L52 and the inductor L53).

Furthermore, the inductor L51 and the capacitor C51 are connected in parallel to constitute a resonant circuit. The inductor L52 and the capacitor C52 are connected in parallel to constitute a resonant circuit. The inductor L53 and the capacitor C53 are connected in parallel to constitute a resonant circuit. The inductor L54 and the capacitor C54 are connected in parallel to constitute a resonant circuit.

It is now supposed that an oscillation frequency f0 of a fundamental wave of a resonant circuit formed of the inductor L51 and the capacitor C51 is represented by Equation (3). It is supposed that the inductor L51 has inductance $L_{L51}$ and the capacitor C51 has capacitance of $C_{C51}$. Furthermore, It is supposed that an oscillation frequency f0 of a fundamental wave of a resonant circuit formed of the inductor L54 and the capacitor C54 is also represented by Equation (3).

$$f0 = 1/\{2\pi(L_{L51} \times C_{C51})\}^{0.5} \quad (3)$$

On the other hand, the resonant circuit formed of the inductor L52 and the capacitor C52 oscillates with a wave having a frequency which is three times the oscillation frequency f0, and its oscillation frequency 3×f0 is represented by Equation (4). It is supposed that the inductor L52 has inductance $L_{L52}$ and the capacitor C52 has capacitance $C_{C52}$. It is supposed that an oscillation frequency 3×f0 of the resonant circuit formed of the inductor L53 and the capacitor C53 is also represented by Equation (4).

$$3 \times f0 = 1/\{2\pi(L_{L52} \times C_{C52})\}^{0.5} \quad (4)$$

In this way, the LC resonant circuits (L52, C52), (L53, C53) which oscillate with a wave having a frequency 2×f0 which is twice the oscillation frequency f0 are incorporated into the DC-DC converter 100. Owing to the harmonic resonant circuits, the oscillation waveform can be made to more closely resemble a square wave.

As a result, the efficiency of the DC-DC converter 100 can be improved.

Operation of the DC-DC converter 100 having the configuration described heretofore is similar to that of the DC-DC converter 100 in the first embodiment already described.

Since the DC-DC converter 100 has the differential configuration already described, the voltage at the terminal TM between the capacitor C52 and the capacitor 53 (between the inductor L52 and the inductor L53) is reduced in ripple and is very stable in the same way as the first and second embodiments. In other words, the DC-DC converter 100 can output more stabilized output voltage Vout.

Furthermore, in the same way as the first and second embodiments, the capacitors C51 to C54 and the inductors L51 to L54 included in the LC-VCO are formed of a semiconductor integrated circuit. As a result, the circuit area in the case where the DC-DC converter 100 is constituted in the form of on-chip can be reduced.

According to the DC-DC converter in the present fifth embodiment, the output voltage can be made more stable while reducing the circuit area in the same way as the first and second embodiments as heretofore described.

The embodiments have been described supposing that the first voltage is the power supply voltage, the second voltage is the ground voltage, the MOS transistor of the first conductivity type is a pMOS transistor, and the MOS transistor of the second conductivity type is an nMOS transistor.

Even if the circuit polarity is inversed, however, similar actions and effects can be obtained. In other words, even if the first voltage is the ground voltage, the second voltage is the power supply voltage, the MOS transistor of the first conductivity type is an nMOS transistor, and the MOS transistor of the second conductivity type is a pMOS transistor, similar actions and effects can be obtained.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A DC-DC converter comprising:
an output terminal which outputs an output voltage;
a first MOS transistor of a first conductivity type connected at a first end thereof to a first voltage line, a first voltage being applied to the first voltage line;
a second MOS transistor of a second conductivity type connected at a first end thereof to a second end of the first MOS transistor and connected at a second end thereof to a second voltage line, a second voltage being applied to the first voltage line and being different from the first voltage;
a third MOS transistor of the first conductivity type connected at a first end thereof to the first voltage line;
a fourth MOS transistor of the second conductivity type connected at a first end thereof to a second end of the third MOS transistor and connected at a second end thereof to the second voltage line;
a first inductor connected between the second end of the first MOS transistor and the output terminal;
a second inductor connected between the second end of the third MOS transistor and the output terminal;
a first capacitor connected between a gate of the second MOS transistor and the second end of the third MOS transistor;
a second capacitor connected between a gate of the fourth MOS transistor and the second end of the first MOS transistor;
a third capacitor connected at a first end thereof to the second end of the first MOS transistor and connected at a second end to the second end of the third MOS transistor;
a first resistor connected at a first end to the gate of the second MOS transistor;
a second resistor connected at a first end thereof to the gate of the fourth MOS transistor; and
a first bias adjustment circuit which compares the output voltage with a preset first reference voltage and which applies a first bias voltage to a second end of the first resistor and a second end of the second resistor to make the output voltage equal to the first reference voltage.

2. The DC-DC converter according to claim 1, further comprising:
a third resistor connected at a first end thereof to a gate of the first MOS transistor;
a fourth resistor connected at a first end thereof to a gate of the third MOS transistor;
an amplitude detection circuit which detects a voltage difference between a voltage at the first end of the third capacitor and a voltage at the second end of the third capacitor and outputs a detected voltage based on the voltage difference; and
a second bias adjustment circuit which compares the detected voltage with a preset second reference voltage and applies a second bias voltage to a second end of the third resistor and a second end of the fourth resistor to make the detected voltage equal to the second reference voltage.

3. The DC-DC converter according to claim 1, wherein the first bias adjustment circuit is a first operational amplifier supplied at a first input terminal thereof with the first reference voltage, supplied at a second input terminal thereof with the output voltage, and connected at output thereof to the second end of the first resistor and the second end of the second resistor.

4. The DC-DC converter according to claim 2, wherein
the first bias adjustment circuit is a first operational amplifier supplied at a first input terminal thereof with the first reference voltage, supplied at a second input terminal thereof with the output voltage, and connected at output thereof to the second end of the first resistor and the second end of the second resistor, and
the second bias adjustment circuit is a second operational amplifier supplied at a first input terminal thereof with the detected voltage, supplied at a second input terminal thereof with the second reference voltage, and connected at output thereof to the second end of the third resistor and the fourth end of the second resistor.

5. The DC-DC converter according to claim 2, further comprising:
a fifth MOS transistor of the first conductivity type connected at a first end thereof to the first voltage line, and connected at a second end thereof to the first end of the third capacitor,
a sixth MOS transistor of the second conductivity type connected at a first end thereof to a second end of the fifth MOS transistor, and connected at a second end thereof to the second voltage line,
a seventh MOS transistor of the first conductivity type connected at a first end thereof to the first voltage line, and connected at a second end thereof to the second end of the third capacitor,
an eighth MOS transistor of the second conductivity type connected at a first end thereof to a second end of the seventh MOS transistor, and connected at a second end thereof to the second voltage line,
a sixth capacitor connected between a gate of the sixth MOS transistor and the second end of the seventh MOS transistor;
a seventh capacitor connected between a gate of the eighth MOS transistor and the second end of the fifth MOS transistor;
an eighth capacitor connected between a gate of the fifth MOS transistor and the second end of the eighth MOS transistor;
a ninth capacitor connected between a gate of the seventh MOS transistor and the second end of the sixth MOS transistor;
a fifth resistor connected at a first end to the gate of the sixth MOS transistor;
a sixth resistor connected at a first end to the gate of the eighth MOS transistor;
a seventh resistor connected at a first end to the gate of the fifth MOS transistor;
an eighth resistor connected at a first end to the gate of the seventh MOS transistor;
a first switch circuit which conducts switching between the first bias voltage and the second voltage and applies one of them to the second end of the first resistor and the second end of the second resistor;
a second switch circuit which conducts switching between the second bias voltage and the first voltage and applies one of them to the second end of the third resistor and the second end of the fourth resistor;
a third switch circuit which conducts switching between the first bias voltage and the second voltage and applies one of them to the second end of the fifth resistor and the second end of the sixth resistor; and a fourth switch circuit which conducts switching between the second bias voltage and the first voltage and applies one of them to the second end of the seven resistor and the second end of the eighth resistor.

6. The DC-DC converter according to claim 4, further comprising:
a fifth MOS transistor of the first conductivity type connected at a first end thereof to the first voltage line, and connected at a second end thereof to the first end of the third capacitor,
a sixth MOS transistor of the second conductivity type connected at a first end thereof to a second end of the fifth MOS transistor, and connected at a second end thereof to the second voltage line,
a seventh MOS transistor of the first conductivity type connected at a first end thereof to the first voltage line, and connected at a second end thereof to the second end of the third capacitor,
an eighth MOS transistor of the second conductivity type connected at a first end thereof to a second end of the seventh MOS transistor, and connected at a second end thereof to the second voltage line,
a sixth capacitor connected between a gate of the sixth MOS transistor and the second end of the seventh MOS transistor;
a seventh capacitor connected between a gate of the eighth MOS transistor and the second end of the fifth MOS transistor;
an eighth capacitor connected between a gate of the fifth MOS transistor and the second end of the eighth MOS transistor;
a ninth capacitor connected between a gate of the seventh MOS transistor and the second end of the sixth MOS transistor;
a fifth resistor connected at a first end to the gate of the sixth MOS transistor;
a sixth resistor connected at a first end to the gate of the eighth MOS transistor;
a seventh resistor connected at a first end to the gate of the fifth MOS transistor;
an eighth resistor connected at a first end to the gate of the seventh MOS transistor;
a first switch circuit which conducts switching between the first bias voltage and the second voltage and applies one of them to the second end of the first resistor and the second end of the second resistor;
a second switch circuit which conducts switching between the second bias voltage and the first voltage and applies one of them to the second end of the third resistor and the second end of the fourth resistor;
a third switch circuit which conducts switching between the first bias voltage and the second voltage and applies one of them to the second end of the fifth resistor and the second end of the sixth resistor; and
a fourth switch circuit which conducts switching between the second bias voltage and the first voltage and applies one of them to the second end of the seven resistor and the second end of the eighth resistor.

7. The DC-DC converter according to claim 1, wherein
a size of the first MOS transistor is equal to a size of the third MOS transistor,
a size of the second MOS transistor is equal to a size of the fourth MOS transistor,
an inductance of the first inductor is equal to a inductance of the second inductor,
a resistance value of the first resistor is equal to a resistance value of the second resistor, and a capacitance of the first capacitor is equal to a capacitance of the second capacitor.

8. The DC-DC converter according to claim 2, wherein
a resistance value of the third resistor is equal to a resistance value of the fourth resistor.

9. The DC-DC converter according to claim 1, wherein the first bias voltage, at a time when the first reference voltage is equal to the output voltage, is lower than threshold voltages of the second and fourth MOS transistors.

10. The DC-DC converter according to claim 1, wherein
the first voltage is a power supply voltage,
the second voltage is a ground voltage,
the first and third MOS transistors are pMOS transistors, and
the second and fourth MOS transistors are nMOS transistors.

11. A semiconductor chip comprising:
an LSI (Large Scale Integration) circuit; and
a DC-DC converter which supplies an output voltage to the LSI circuit,
the DC-DC converter comprising:
an output terminal which outputs the output voltage;
a first MOS transistor of a first conductivity type connected at a first end thereof to a first voltage line, a first voltage being applied to the first voltage line;
a second MOS transistor of a second conductivity type connected at a first end thereof to a second end of the first MOS transistor and connected at a second end thereof to a second voltage line, a second voltage being applied to the first voltage line and being different from the first voltage;
a third MOS transistor of the first conductivity type connected at a first end thereof to the first voltage line;
a fourth MOS transistor of the second conductivity type connected at a first end thereof to a second end of the third MOS transistor and connected at a second end thereof to the second voltage line;
a first inductor connected between the second end of the first MOS transistor and the output terminal;
a second inductor connected between the second end of the third MOS transistor and the output terminal;
a first capacitor connected between a gate of the second MOS transistor and the second end of the third MOS transistor;
a second capacitor connected between a gate of the fourth MOS transistor and the second end of the first MOS transistor;
a third capacitor connected at a first end thereof to the second end of the first MOS transistor and connected at a second end to the second end of the third MOS transistor;
a first resistor connected at a first end to the gate of the second MOS transistor;
a second resistor connected at a first end thereof to the gate of the fourth MOS transistor; and
a first bias adjustment circuit which compares the output voltage with a preset first reference voltage and which applies a first bias voltage to a second end of the first resistor and a second end of the second resistor to make the output voltage equal to the first reference voltage.

12. The semiconductor chip according to claim 11, further comprising:
a third resistor connected at a first end thereof to a gate of the first MOS transistor;
a fourth resistor connected at a first end thereof to a gate of the third MOS transistor;

an amplitude detection circuit which detects a voltage difference between a voltage at the first end of the third capacitor and a voltage at the second end of the third capacitor and outputs a detected voltage based on the voltage difference; and a second bias adjustment circuit which compares the detected voltage with a preset second reference voltage and applies a second bias voltage to a second end of the third resistor and a second end of the fourth resistor to make the detected voltage equal to the second reference voltage.

13. The semiconductor chip according to claim 11, wherein the first bias adjustment circuit is a first operational amplifier supplied at a first input terminal thereof with the first reference voltage, supplied at a second input terminal thereof with the output voltage, and connected at output thereof to the second end of the first resistor and the second end of the second resistor.

14. The semiconductor chip according to claim 12, wherein the first bias adjustment circuit is a first operational amplifier supplied at a first input terminal thereof with the first reference voltage, supplied at a second input terminal thereof with the output voltage, and connected at output thereof to the second end of the first resistor and the second end of the second resistor, and the second bias adjustment circuit is a second operational amplifier supplied at a first input terminal thereof with the detected voltage, supplied at a second input terminal thereof with the second reference voltage, and connected at output thereof to the second end of the third resistor and the fourth end of the second resistor.

15. The semiconductor chip according to claim 12, further comprising:

a fifth MOS transistor of the first conductivity type connected at a first end thereof to the first voltage line, and connected at a second end thereof to the first end of the third capacitor, a sixth MOS transistor of the second conductivity type connected at a first end thereof to a second end of the fifth MOS transistor, and connected at a second end thereof to the second voltage line, a seventh MOS transistor of the first conductivity type connected at a first end thereof to the first voltage line, and connected at a second end thereof to the second end of the third capacitor, an eighth MOS transistor of the second conductivity type connected at a first end thereof to a second end of the seventh MOS transistor, and connected at a second end thereof to the second voltage line, a sixth capacitor connected between a gate of the sixth MOS transistor and the second end of the seventh MOS transistor;

a seventh capacitor connected between a gate of the eighth MOS transistor and the second end of the fifth MOS transistor;

an eighth capacitor connected between a gate of the fifth MOS transistor and the second end of the eighth MOS transistor;

a ninth capacitor connected between a gate of the seventh MOS transistor and the second end of the sixth MOS transistor;

a fifth resistor connected at a first end to the gate of the sixth MOS transistor;

a sixth resistor connected at a first end to the gate of the eighth MOS transistor;

a seventh resistor connected at a first end to the gate of the fifth MOS transistor;

an eighth resistor connected at a first end to the gate of the seventh MOS transistor;

a first switch circuit which conducts switching between the first bias voltage and the second voltage and applies one of them to the second end of the first resistor and the second end of the second resistor;

a second switch circuit which conducts switching between the second bias voltage and the first voltage and applies one of them to the second end of the third resistor and the second end of the fourth resistor;

a third switch circuit which conducts switching between the first bias voltage and the second voltage and applies one of them to the second end of the fifth resistor and the second end of the sixth resistor; and a fourth switch circuit which conducts switching between the second bias voltage and the first voltage and applies one of them to the second end of the seven resistor and the second end of the eighth resistor.

16. The semiconductor chip according to claim 14, further comprising:

a fifth MOS transistor of the first conductivity type connected at a first end thereof to the first voltage line, and connected at a second end thereof to the first end of the third capacitor, a sixth MOS transistor of the second conductivity type connected at a first end thereof to a second end of the fifth MOS transistor, and connected at a second end thereof to the second voltage line, a seventh MOS transistor of the first conductivity type connected at a first end thereof to the first voltage line, and connected at a second end thereof to the second end of the third capacitor, an eighth MOS transistor of the second conductivity type connected at a first end thereof to a second end of the seventh MOS transistor, and connected at a second end thereof to the second voltage line, a sixth capacitor connected between a gate of the sixth MOS transistor and the second end of the seventh MOS transistor;

a seventh capacitor connected between a gate of the eighth MOS transistor and the second end of the fifth MOS transistor;

an eighth capacitor connected between a gate of the fifth MOS transistor and the second end of the eighth MOS transistor;

a ninth capacitor connected between a gate of the seventh MOS transistor and the second end of the sixth MOS transistor;

a fifth resistor connected at a first end to the gate of the sixth MOS transistor;

a sixth resistor connected at a first end to the gate of the eighth MOS transistor;

a seventh resistor connected at a first end to the gate of the fifth MOS transistor;

an eighth resistor connected at a first end to the gate of the seventh MOS transistor;

a first switch circuit which conducts switching between the first bias voltage and the second voltage and applies one of them to the second end of the first resistor and the second end of the second resistor;

a second switch circuit which conducts switching between the second bias voltage and the first voltage and applies one of them to the second end of the third resistor and the second end of the fourth resistor;

a third switch circuit which conducts switching between the first bias voltage and the second voltage and applies one of them to the second end of the fifth resistor and the second end of the sixth resistor; and a fourth switch circuit which conducts switching between the second bias voltage and the first voltage and applies one of them to the second end of the seven resistor and the second end of the eighth resistor.

17. The semiconductor chip according to claim 11, wherein a size of the first MOS transistor is equal to a size of the third MOS transistor, a size of the second MOS transistor is equal to a size of the fourth MOS transistor, an inductance of the first inductor is equal to a inductance of the second inductor, a resistance value of the first resistor is equal to a resistance value of the second resistor, and a capacitance of the first capacitor is equal to a capacitance of the second capacitor.

18. The semiconductor chip according to claim 12, wherein a resistance value of the third resistor is equal to a resistance value of the fourth resistor.

19. The semiconductor chip according to claim 11, wherein the first bias voltage, at a time when the first reference voltage is equal to the output voltage, is lower than threshold voltages of the second and fourth MOS transistors.

20. The semiconductor chip according to claim 11, wherein the first voltage is a power supply voltage, the second voltage is a ground voltage, the first and third MOS transistors are pMOS transistors, and the second and fourth MOS transistors are nMOS transistors.

* * * * *